United States Patent
Nemoto et al.

(10) Patent No.: US 7,242,526 B2
(45) Date of Patent: Jul. 10, 2007

(54) LENS PLATE, METHOD FOR MANUFACTURING THE SAME AND IMAGE TRANSFER DEVICE

(75) Inventors: Hiroyuki Nemoto, Osaka (JP); Shiro Sato, Osaka (JP)

(73) Assignee: Nippon Sheet Glass Company, Limited, Tokyo (JP)

( * ) Notice: Subject to any disclaimer, the term of this patent is extended or adjusted under 35 U.S.C. 154(b) by 0 days.

(21) Appl. No.: 11/494,314

(22) Filed: Jul. 27, 2006

(65) Prior Publication Data

US 2006/0262412 A1 Nov. 23, 2006

Related U.S. Application Data

(62) Division of application No. 10/878,580, filed on Jun. 28, 2004, now Pat. No. 7,116,484.

(30) Foreign Application Priority Data

| Jul. 1, 2003 | (JP) | ............................. 2003-270056 |
| Jul. 1, 2003 | (JP) | ............................. 2003-270061 |
| Mar. 25, 2004 | (JP) | ............................. 2004-88334 |
| Apr. 6, 2004 | (JP) | ............................. 2004-111678 |

(51) Int. Cl.
G02B 27/10 (2006.01)
(52) U.S. Cl. ..................... 359/626; 359/620
(58) Field of Classification Search ............... 359/620, 359/621, 622, 626
See application file for complete search history.

(56) References Cited

U.S. PATENT DOCUMENTS

| 3,592,542 A | 7/1971 | Kaufer et al. |
| 4,168,900 A | 9/1979 | Adachi |
| 4,448,499 A | 5/1984 | Tokumaru |
| 4,496,984 A | 1/1985 | Stoffel |
| 4,512,641 A | 4/1985 | Mochizuki et al. |
| 5,270,859 A | 12/1993 | Wirth et al. |
| 6,088,164 A | 7/2000 | Fukasawa |
| 6,133,986 A | 10/2000 | Johnson |
| 6,373,635 B1 * | 4/2002 | Fujimoto et al. ........... 359/619 |
| 6,462,794 B1 | 10/2002 | Yoshikawa et al. |
| 6,710,925 B2 | 3/2004 | Nemoto |
| 6,970,288 B2 | 11/2005 | Ebina et al. |
| 6,982,833 B2 | 1/2006 | Nemoto |
| 7,116,484 B2 * | 10/2006 | Nemoto et al. ............. 359/626 |

OTHER PUBLICATIONS

Watson et al. "Analysis of Fill Factor Improvement Using Microlens Arrays", Mar. 1998, SPIE, vol. 3276, pp. 123-134.

* cited by examiner

*Primary Examiner*—David N. Spector
(74) *Attorney, Agent, or Firm*—RatnerPrestia

(57) ABSTRACT

Spherical convex micro-lenses are arranged between rectangular grooves adjacent to each other of a lens plate. The arrangement of convex micro-lenses is made to be in parallel with the short-side direction of the lens plate, namely, the direction of the rectangular grooves. Since stray light appears mainly on the convex micro-lenses arranged in the long-side direction of the lens plate, the stray light to appear in the long-side direction of the lens plate is removed by forming grooves at regular intervals in the long-side direction of the lens plate and forming a light absorbing film in each of the rectangular grooves. Or the stray light to appear in the long-side direction of the lens plate is removed by making the direction of arrangement of convex micro-lenses different from the long-side direction of the lens plate.

4 Claims, 22 Drawing Sheets

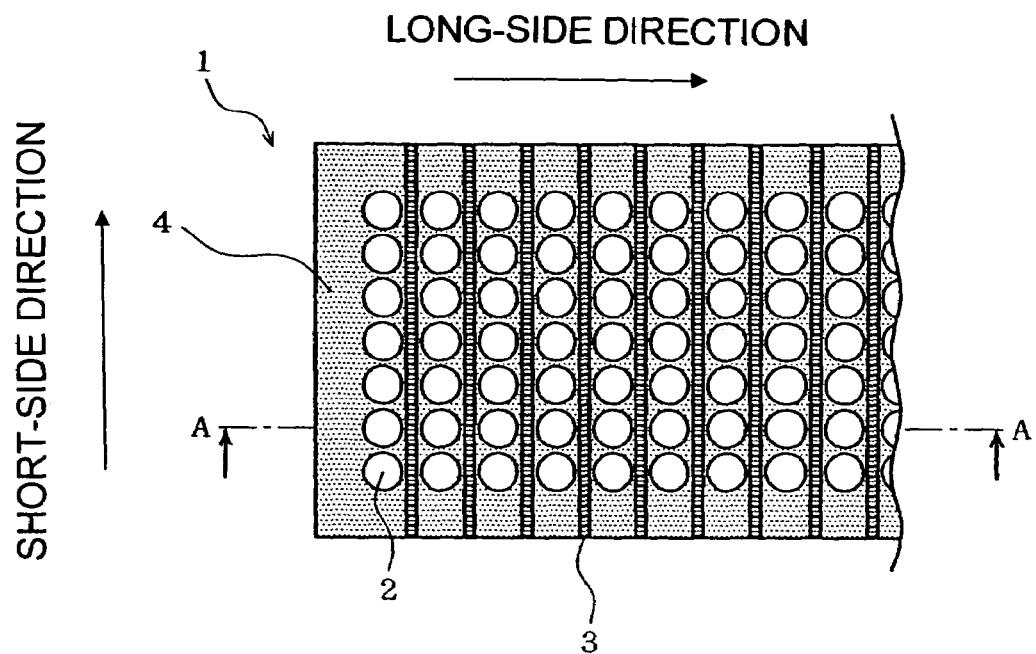
F I G. 1
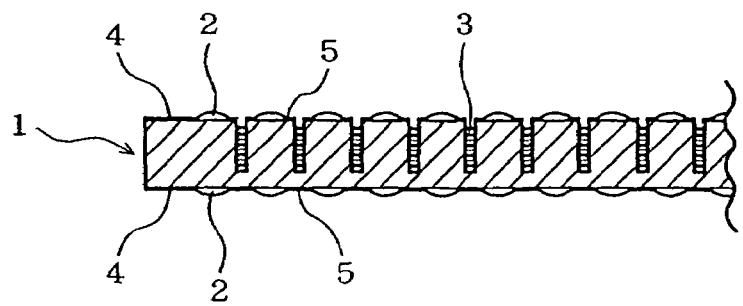
F I G. 2

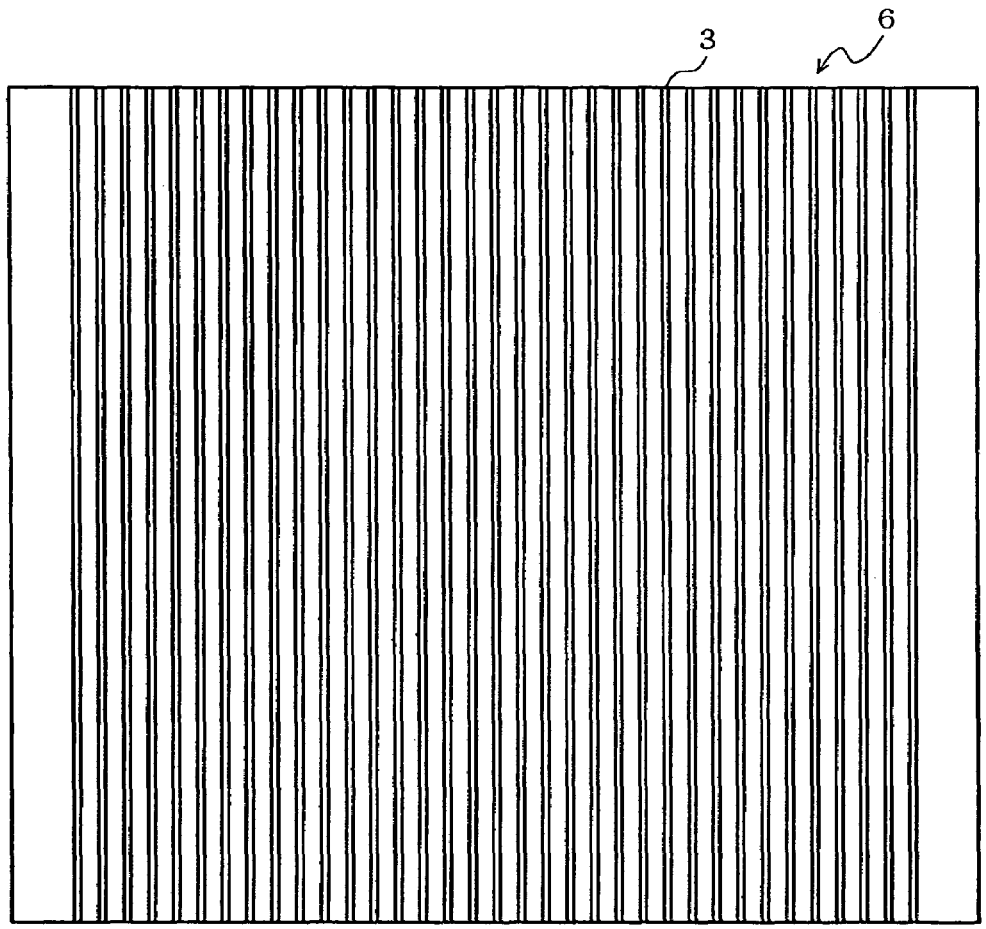
FIG. 3

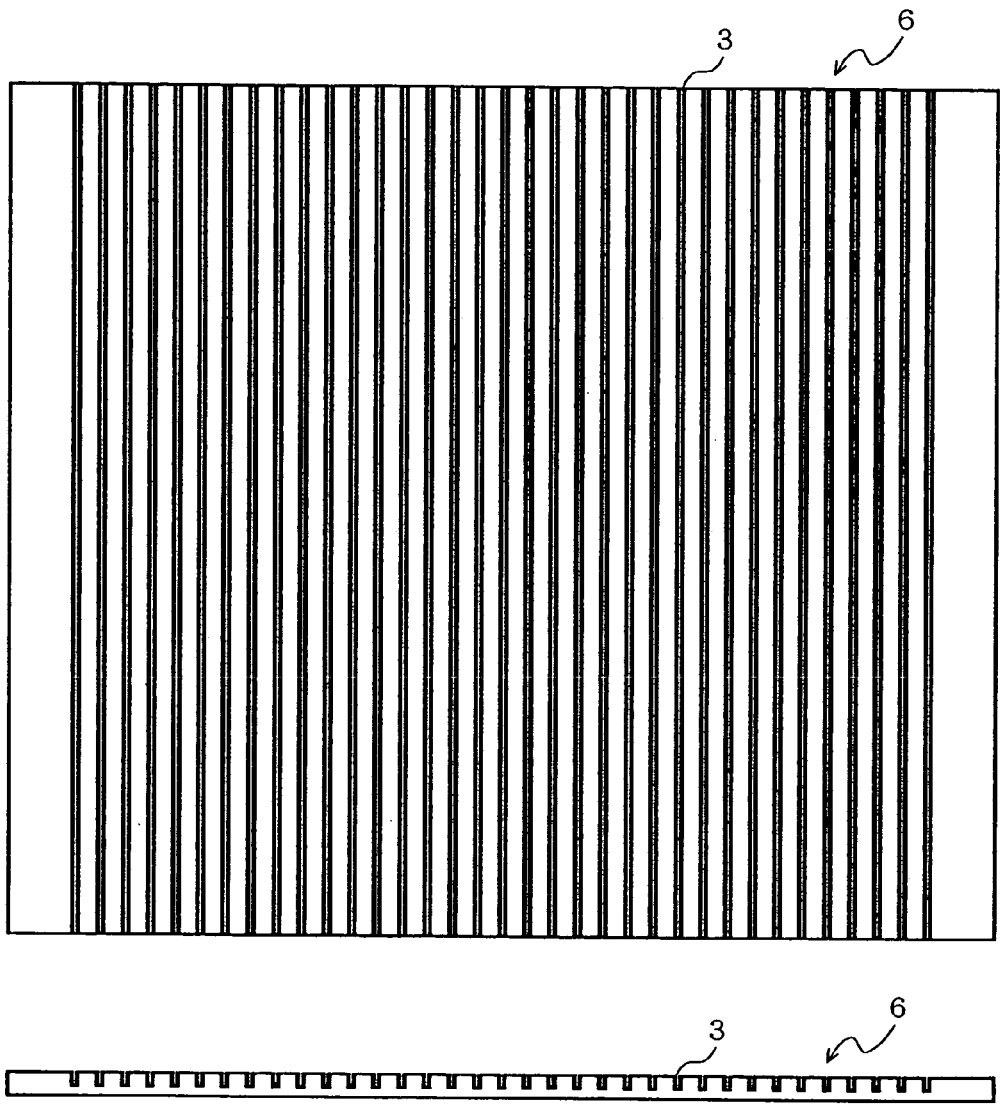
F I G . 4

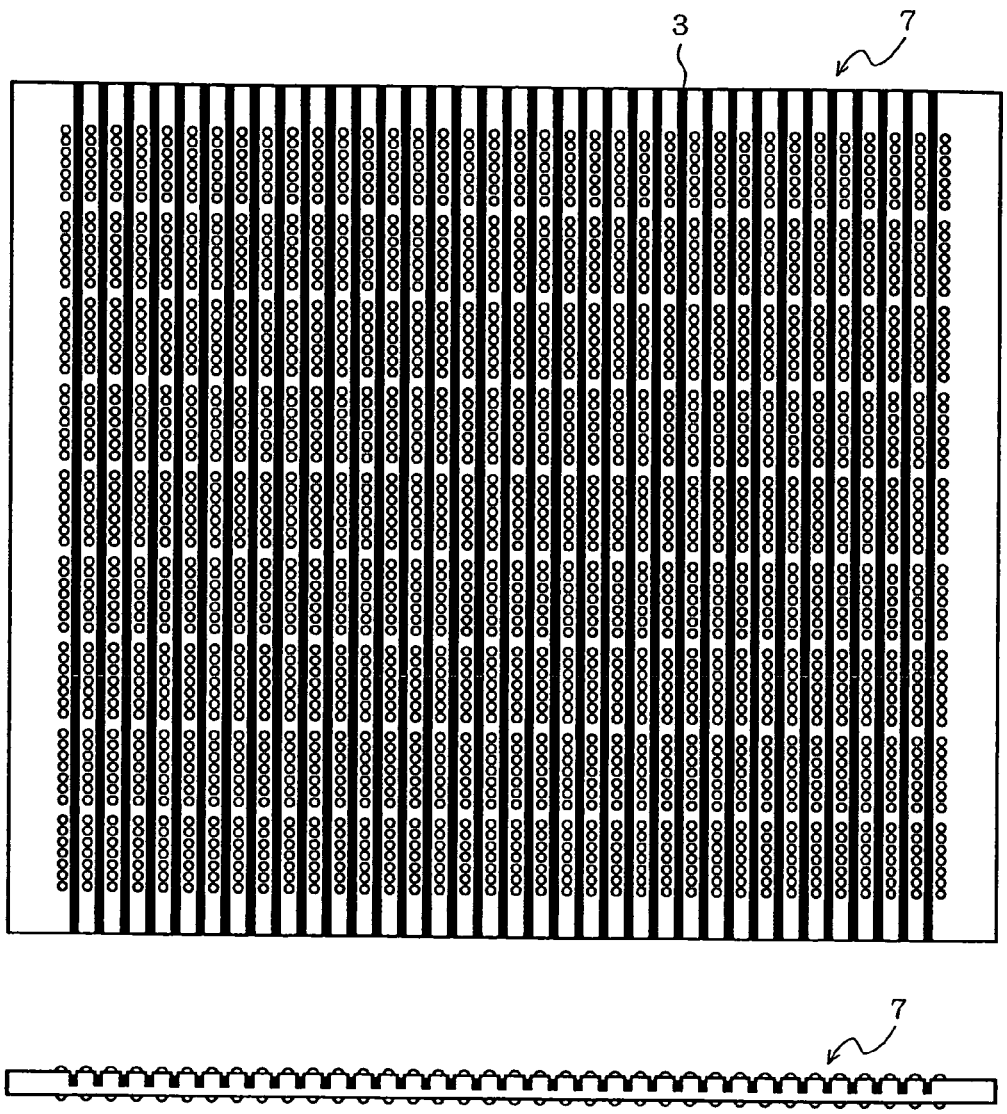
F I G. 5

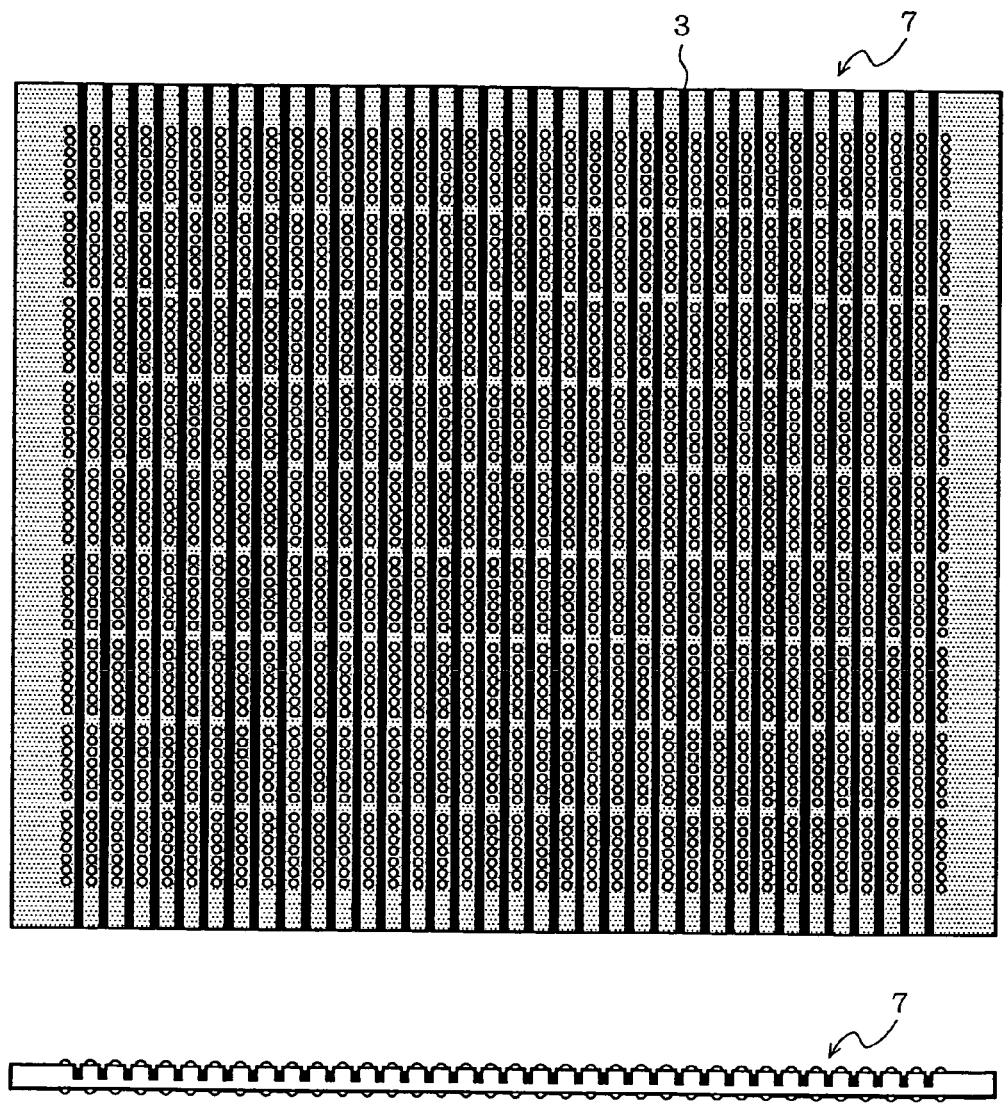
F I G. 7

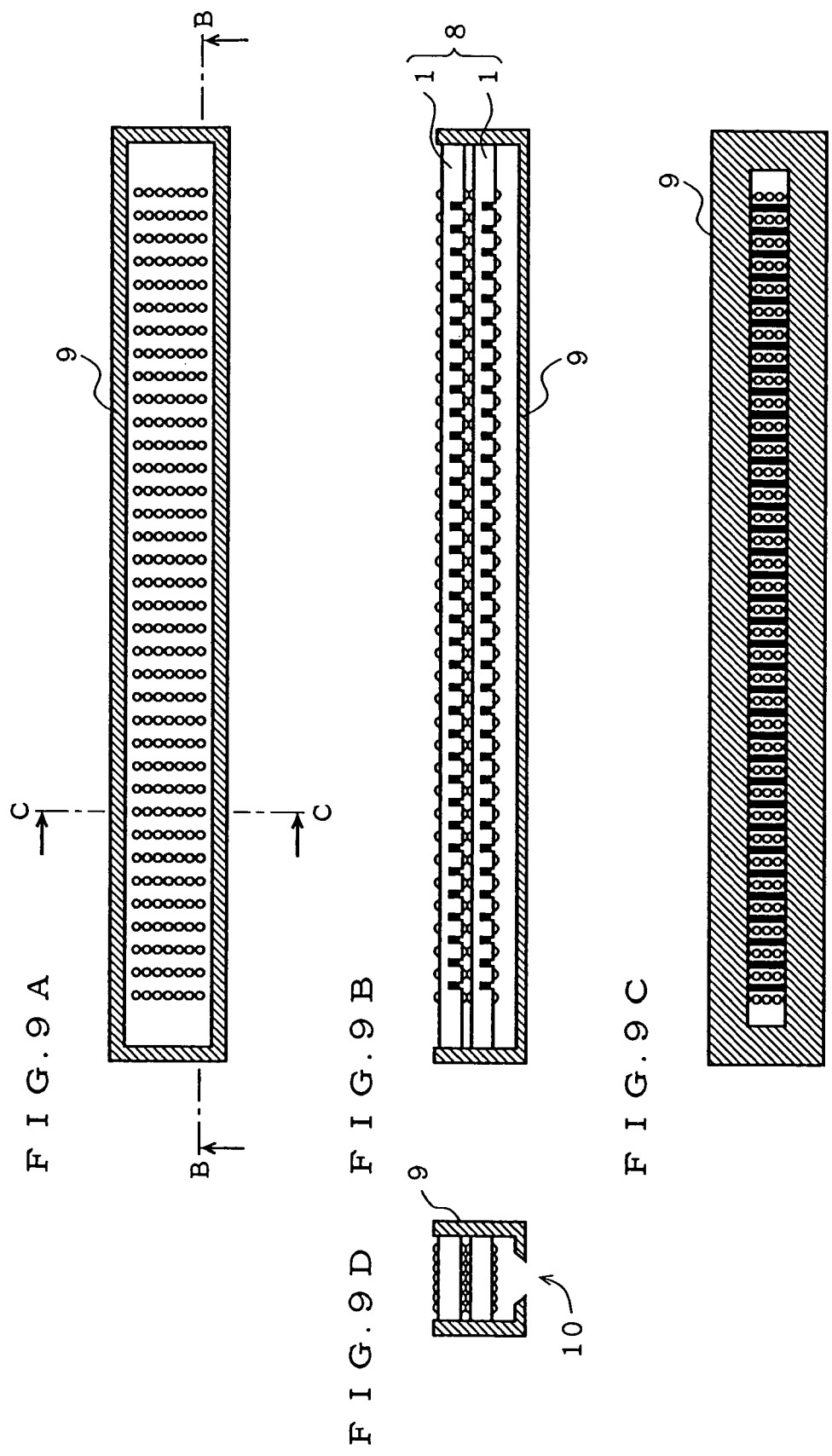

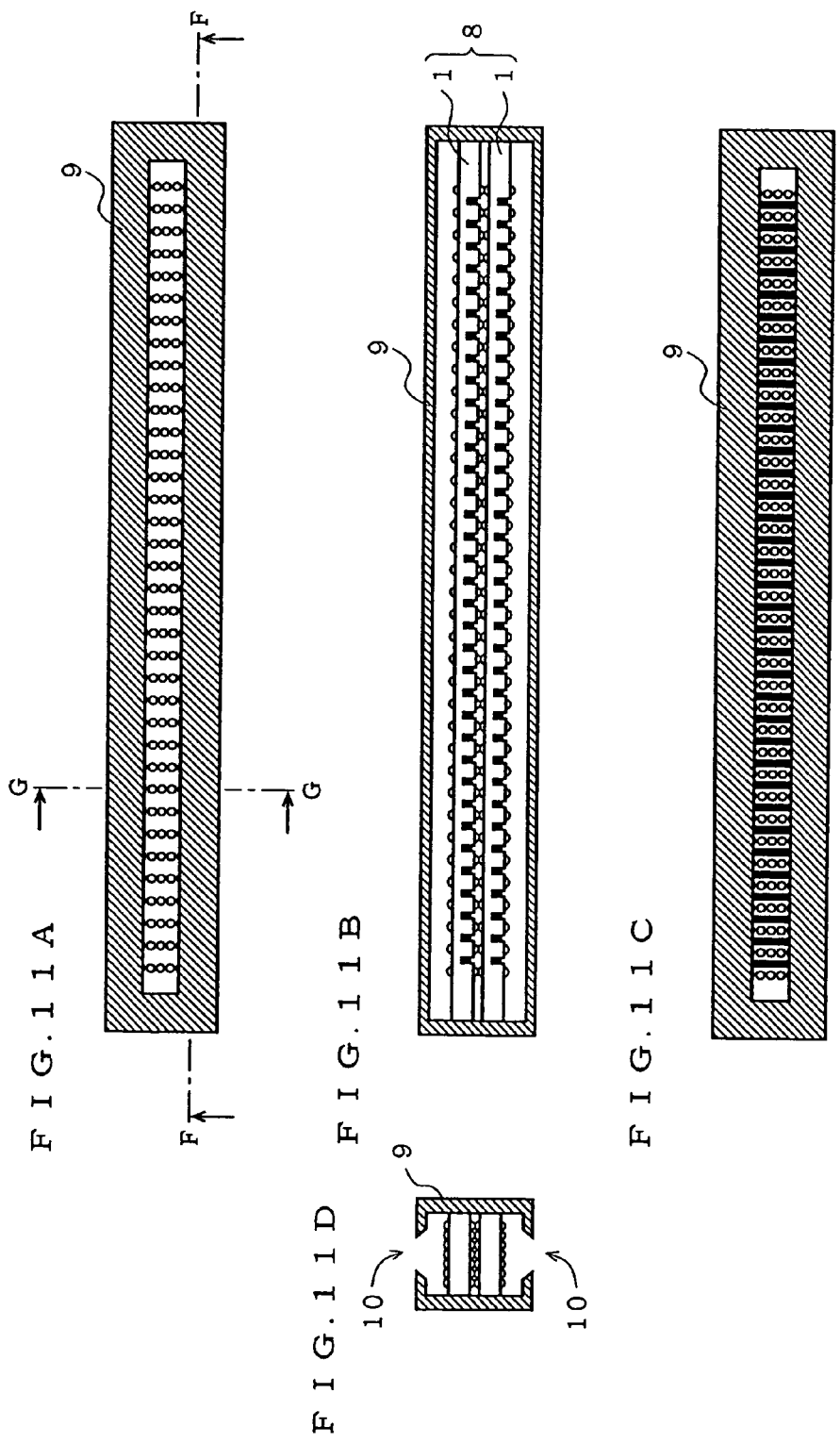

SHORT-SIDE DIRECTION
(SUB-SCANNING DIRECTION)

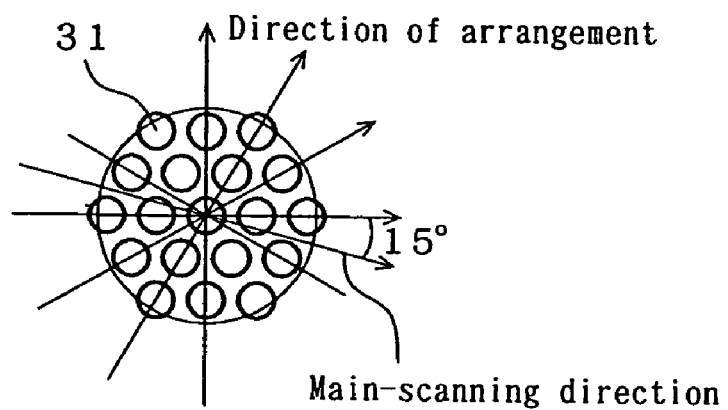
F I G. 1 6
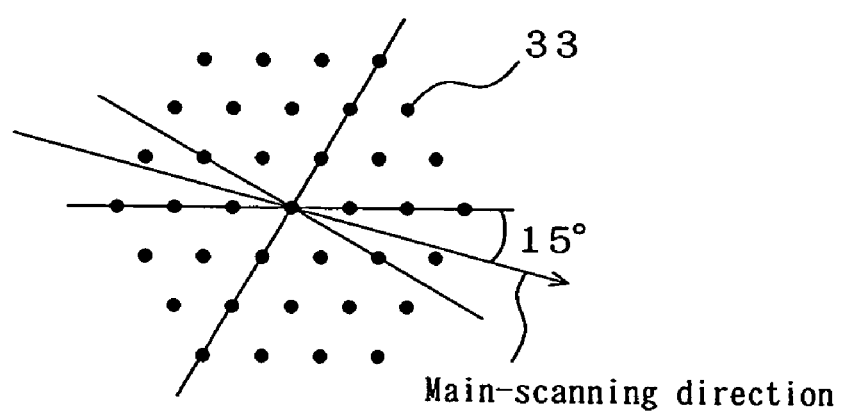
F I G. 1 7

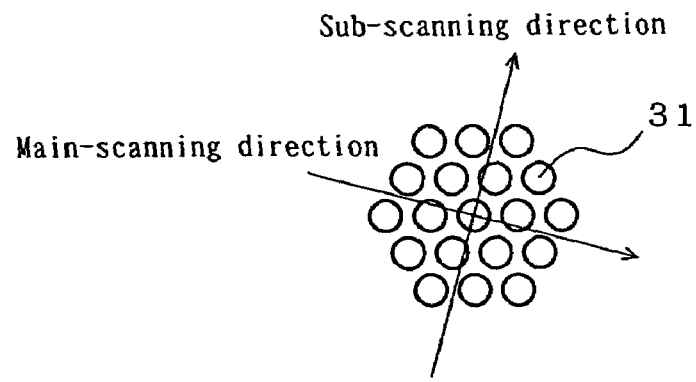
F I G. 2 2
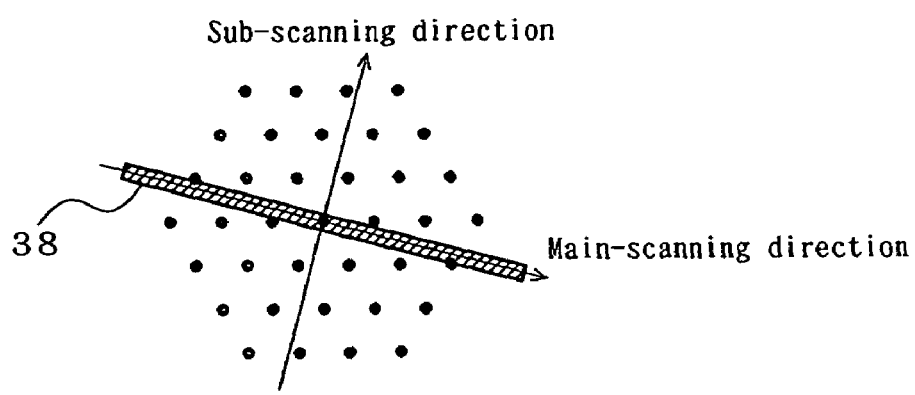
F I G. 2 3 ns Plate, Method for Manufacturing the Same and Image Transfer Device

This application is a divisional of U.S. application Ser. No. 10/878,580, filed Jun. 28, 2004 now U.S. Pat. No. 7,116,484, the entire contents of which are hereby incorporated herein by reference.

BACKGROUND OF THE INVENTION

1. Field of the Invention

The present invention relates to a lens plate capable of removing stray light, a method for manufacturing the same and an image transfer device for transferring an image to a linear image formation area using an erecting lens array formed by combining lens plates.

2. Description of the Related Art

An optical system of a device for reading an image includes a reducing system and a unit magnification system. A lens array to be used in a unit magnification system is an erecting unit magnification lens array and ordinarily has several rows of rod lenses defined herein as lens rows arranged along a long-side direction of the lens array (in a main-scanning direction of an image reading device). Although it is possible to improve the transferability of a light quantity and reduce an unevenness in quantity of transmitted light by increasing the number of rows of lenses, the number of lens rows, in general, is one factor in consideration of a manufacturing cost for a lens array using rod lenses.

On the other hand, an erecting unit magnification lens array can also be formed using a resin lens plate having a plurality of convex micro-lenses arranged on its surface. A lens array using such a resin lens plate provides an advantage of enabling a lens array having a plurality of lens rows to be manufactured at a comparatively low cost.

However, since an erecting unit magnification lens array using a conventional resin lens plate does not have a wall for shading a light beam between lenses adjacent to each other, there is a problem of stray light that a light beam obliquely entering a lens plate obliquely proceeds through the plate, enters an adjacent convex lens and then exits the lens to form a ghost image.

There are known methods to counter such stray light. One method of forms a light shading layer between adjacent lenses. A method forms a light shading layer between lens plates arranged opposite to each other. A light shading layer may be formed by means of a photolithography process using a photoresist containing a light absorbing agent. Another method forms a light shading layer by applying a light absorbing paint to the whole surface of a lens face and removing only the light absorbing paint on the lens part. A further method forms a light shading layer by applying a light absorbing paint to a part on which a light shading layer is to be formed by means of an ink-jet printing method. Another method forms a light shading layer by forming a groove in a part on which a light shading layer is to be formed and filling this groove with, for example, a light absorbing paint.

The formation of light shading layers around lenses, between adjacent lenses and between lens plates arranged opposite to each other is effective for removing light coming in from outside of a lens area or removing light obliquely entering a lens and exiting from the outside of a lens area. However, the light shading layers cannot remove stray light formed by light obliquely entering a lens, passing through a lens plate in the direction of a thickness of the lens plate and exiting from the exit side of a lens adjacent to that lens.

In the case of forming a light shading layer by forming a groove and filling the groove with a light absorbing paint, the groove may be formed by means of a transfer molding method using a metal mold. A light shading film may be formed on side faces and a bottom face of the groove. The depth of the groove is limited by the formability of a lens shape or the releasability of a lens plate from the metal mold. Therefore, it is difficult to obtain a groove having an aspect ratio necessary for forming a light shading layer necessary for removing stray light formed by light obliquely entering a lens, passing through a lens plate in the thickness direction of the lens plate and exiting from the exit side of a lens adjacent to that lens.

Therefore, an erecting unit magnification lens array using a conventional resin lens plate still has a problem in that it cannot sufficiently remove stray light, makes a ghost image and is inferior in resolution.

An object of the present invention is to provide an erecting lens array capable of sufficiently removing stray light.

Another object of the present invention is to provide an image transfer device capable of sufficiently removing stray light in using an erecting lens array.

SUMMARY OF THE INVENTION

A first aspect of the present invention is a lens plate comprising a rectangular plate having a plurality of grooves formed in the plate to a specific depth at specific intervals in parallel with one another in the short-side direction of the plate, a plurality of lens rows of convex micro-lens formed with said grooves between them at specific intervals in parallel with one another in the short-side direction of the plate, and light absorbing films formed in said grooves. Said grooves each are formed to a depth of ⅓ or more of the thickness of said plate.

A second aspect of the present invention is a method for manufacturing a lens plate comprising the steps of molding a rectangular plate having a plurality of grooves formed to a specific depth at specific intervals in parallel with one another in the short-side direction of the plate, forming in the plate a plurality of lens rows of convex micro-lenses with said grooves between them at specific intervals in parallel with one another in the short-side direction of the plate, and forming light absorbing films in said grooves. The convex micro-lenses are formed on the plate by a hot-embossing method.

A third aspect of the present invention is an image transfer device using an erecting lens array formed by combining two or more lens plates as described above.

A fourth aspect of the present invention is an image transfer device for transferring an image to a linear image formation area, comprising a light source, and an erecting lens array being at least provided with a first lens plate being rectangular and arranged at the light entrance side and having a lens formation area in which convex micro-lenses are regularly arranged at intervals of specified lens pitch on at least one face of it and a second lens plate being in the same shape as the first lens plate and arranged at the light exit side, said erecting lens array containing the whole of one or more of said convex micro-lenses in a light beam input enabling area (in a possible area of light incidence) in the first lens plate of a light beam outputted from said light source.

The direction of arrangement of convex micro-lenses and the long-side direction of a lens formation area are not the same as each other. The other areas than portions functioning as lenses have light absorbency on one or both faces of at least one lens plate, light absorbing walls for removing unnecessary light beams are provided between convex micro-lenses at least on one lens plate, and grooves for removing unnecessary light beams are provided between convex micro-lenses on one or both faces of at least one lens plate.

And the direction of arrangement of convex micro-lenses and the long-side direction of a linear image formation area are not the same as each other. In case that the arrangement of convex micro-lenses is a hexagonal arrangement in which lenses are hexagonally arranged, the direction of a line tying the centers of lenses and the long-side direction of a linear image formation area are not the same within a circular area having a length of two times the lens pitch as its radius and one convex micro-lens as its center. In case that the arrangement of convex micro-lenses is a rectangular arrangement in which lenses are arranged in the shape of a matrix (in a grid), the direction of a line tying the centers of lenses and the long-side direction of a linear image formation area are not the same within a circular area having a length of $((\text{long pitch})^2+(\text{short pitch})^2)^{1/2}$ as its radius and having one convex micro-lens as its center.

And the erecting lens array is provided with a slit-shaped opening for removing unnecessary light beams within the object point side working distance and/or the image point side working distance.

BRIEF DESCRIPTION OF THE DRAWINGS

FIG. 1 is a plan view showing a lens plate according to the present invention.

FIG. 2 is a sectional view taken along line A—A of FIG. 1.

FIG. 3 shows a plan view and a side view showing a resin plate formed by an extrusion molding method.

FIG. 4 shows a plan view and a side view showing a resin plate having light absorbing films formed in rectangular grooves.

FIG. 5 shows a plan view and a side view showing a large-size lens plate having convex micro-lenses formed on both faces of it by a hot-embossing method.

FIG. 7 shows a plan view and a side view showing a large-size lens plate having a black resist applied to it.

FIG. 9A is a plan view showing an example of an image transfer device using lens plates according to the present invention.

FIG. 9B is a sectional view taken along line B—B of FIG. 9A.

FIG. 9C is a bottom view showing the image transfer device shown in FIG. 9A.

FIG. 9D is a sectional view taken along line C—C of FIG. 9A.

FIG. 11A is a plan view showing a further example of an image transfer device using lens plates according to the present invention.

FIG. 11B is a sectional view taken along line F—F of FIG. 11A.

FIG. 11C is a bottom view showing the image transfer device shown in FIG. 11A.

FIG. 11D is a sectional view taken along line G—G of FIG. 11A.

FIG. 16 is a magnified view showing the arrangement of individual convex micro-lenses within a circular area having a length of two times the lens pitch as its radius and having one convex micro-lens as its center on a lens plate.

FIG. 17 is a magnified view showing point light source images formed on an image plane.

FIG. 22 is a magnified view showing the arrangement of individual convex micro-lenses within a circular area having a length of two times the lens pitch as its radius and one convex micro-lens as its center on a lens plate.

FIG. 23 is a magnified view showing an image formed on a linear solid-state image sensor in a linear image formation area.

DETAILED DESCRIPTION OF THE PREFERRED EMBODIMENTS

Figure 6A:
FIG. 6A is a partial magnified sectional view of a resin plate before lens rows are formed in the resin plate by a hot-embossing method.

A first embodiment of the present invention is described with reference to the drawings.

FIG. 1 is a plan view showing a lens plate for forming an erecting lens array to be used in a projector for projecting a three-dimensional or two-dimensional image in space, an image projector for projecting an image onto a screen and an image transfer device for forming an image on a light receiving device or a photosensitive member, and FIG. 2 is a sectional view taken along line A—A of FIG. 1.

A lens plate 1 has a plurality of rectangular grooves formed at specified intervals in parallel with one another relative to the short-side direction. A rectangular groove 3 has a high aspect ratio in which the depth of its opening is larger than its width. In this case, a groove is formed having a depth of about 4 times the width of its opening and about 60% of the thickness of the lens plate 1. The rectangular groove 3 is preferably formed to a depth of ⅓ or more of the thickness of the lens plate 1.

A material for the lens plate 1 is preferably thermoplastic, high in light transmittance and low in moisture absorbency. In this embodiment, the lens plate 1 is made of a cycloolefin-based resin. A material for the lens plate 1 may be an acrylic-based resin.

The lens plate 1 has a plurality of lens rows of spherical convex micro-lenses 2, arranged in parallel with one another along the short-side direction. The lens rows of convex micro-lenses 2 are formed at specified intervals with each rectangular groove 3 between the lens rows. The shape of each convex micro-lens 2 is circular in a planar direction of the lens plate. The convex micro-lenses 2 are formed on both faces of the lens plate 1 and are arranged so that the optical axes of the convex micro-lenses 2 coincide with each other at both faces.

In this embodiment, the shape of a convex micro-lens is spherical but can be also be aspherical. In addition to a structure in which convex micro-lenses are formed on both faces of a lens plate, a structure in which they are formed on one face of the lens plate is also conceivable. In case lens rows of convex micro-lenses are formed on one face of a lens plate, rectangular grooves are preferably formed on the face having the lens rows of convex micro-lens or on an opposite face. When rows of convex micro-lenses are formed on both faces of a lens plate, rectangular grooves are preferably formed on at least one of the faces having the lens rows of convex micro-lens.

In this embodiment, lens rows of convex micro-lenses and rectangular grooves are formed in the short-side direction of a lens plate (in a direction perpendicular to the long-side direction of the lens plate). However, the lens rows of convex micro-lenses and the rectangular grooves may be arranged in parallel with each other and be formed in an oblique direction to the long-side direction of the lens plate.

A low-reflection film of a silica compound coat is formed on the surface of the lens plate 1. The low-reflection film is intended to reduce the reflectivity of the lens plate and can use a material being low in refractive index than the lens plate. A fluorine-based resin film and the like may be used in addition to a silica compound coat.

In order to prevent stray light from coming in from the other portions than lenses, a mask 4 and an aperture stop 5 composed of a light absorbing film are formed outside of lens formation areas of both faces of the lens plate 1 and on outer circumferential areas of convex micro-lenses. The lens formation area refers to the area encompassed by micro-lenses 2 in the long-side direction and the sort-side direction.

Further, a light absorbing film is also formed on the side faces and the bottom face of each rectangular groove 3. As described above, the rectangular groove 3 is preferably formed to a depth of ⅓ or more of the thickness of the lens plate 1. Light inputted at an angle wider than a field angle of a lens out of the light obliquely inputted can thus be shaded by a light shading portion of a light absorbing film provided to a depth of ⅓ or more.

Next, a method for manufacturing a lens plate according to the present invention is described.

First, a resin plate that is to become a substrate for a lens plate is made by an extrusion molding method or an injection molding method. FIG. 3 shows a plan view and a side view of a resin plate made by an extrusion molding method.

A metal mold has a rectangular groove 3 inverted shape formed on it so as to be capable of molding the rectangular grooves 3 at the same time as molding the resin plate. The resin plate 6 is molded so as to be large enough to form a number of lens plates arranged in parallel.

Next, light absorbing films for preventing stray light are formed in the rectangular grooves 3. A black resin paint containing carbon (resist, ink, etc.) for example is used for a light absorbing film. The formation of light absorbing films is performed by applying a black resist to the bottom face and side faces of the grooves 3. The application of the black resist to the rectangular grooves 3 can be easily performed by utilizing a capillary phenomenon. FIG. 4 shows a plan view and a side view of a resin plate 6 having light absorbing films in the rectangular grooves 3.

Next, a large-size lens plate is formed having a number of lens plates formed in parallel by simultaneously forming convex micro-lens rows by a hot-embossing method on both faces of the resin plate 6 having the black resist applied to the rectangular grooves 3. The hot-embossing method is a resin molding method of transferring the shape of metal molds to a resin plate by holding the heated resin plate between the metal molds. FIG. 5 shows a plan view and a side view showing a large-size lens plate 7 having convex micro-lenses formed on both faces by the hot-embossing method.

Figure 6B:
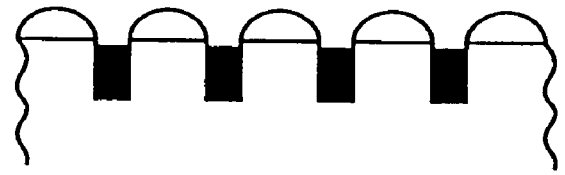
FIG. 6B is a partial magnified sectional view of a resin plate after lens rows have been formed in the resin plate by a hot-embossing method.

FIG. 6A is a partial magnified sectional view showing a resin plate before lens rows are formed on the resin plate by the hot-embossing method, and FIG. 6B is a partial magnified sectional view of a resin plate after lens rows have been formed on the resin plate by the hot-embossing method.

When lens rows of convex micro-lens are formed by a hot-embossing method after light absorbing films have been formed in rectangular grooves 3, the grooves are crushed and filled by heat and pressure and thereby black light shading walls are formed inside a lens plate. That is to say, spaces provided by the grooves are crushed to disappear. The strength as a lens plate is thus increased.

Next, a low-reflection film of a silica compound coat is formed on the surface of the large-size lens plate 7 having a number of lens plates formed in parallel. The low-reflection film is intended to reduce the reflectivity of the lens plates and can also use for example, a fluorine-based resin film in addition to the silica compound coat.

Light absorbing films for preventing stray light from being inputted from portions other than the lenses are formed outside the lens formation areas on both faces of the lens plate and on the outer circumferential portions of the convex micro-lenses. A photo-reactive material, for example, a black resist containing carbon is used for the light absorbing films, and a mask outside the lens formation area and an aperture stop on the outer circumferential portion of each convex micro-lens are formed by a photolithography process. FIG. 7 shows a plan view and a side view showing a large-size lens plate 7 having a black resist applied to it.

Each of the processes up to this state are performed collectively in the state of a large-size lens plate 7 having a number of lens plates formed in parallel.

Figure 8:
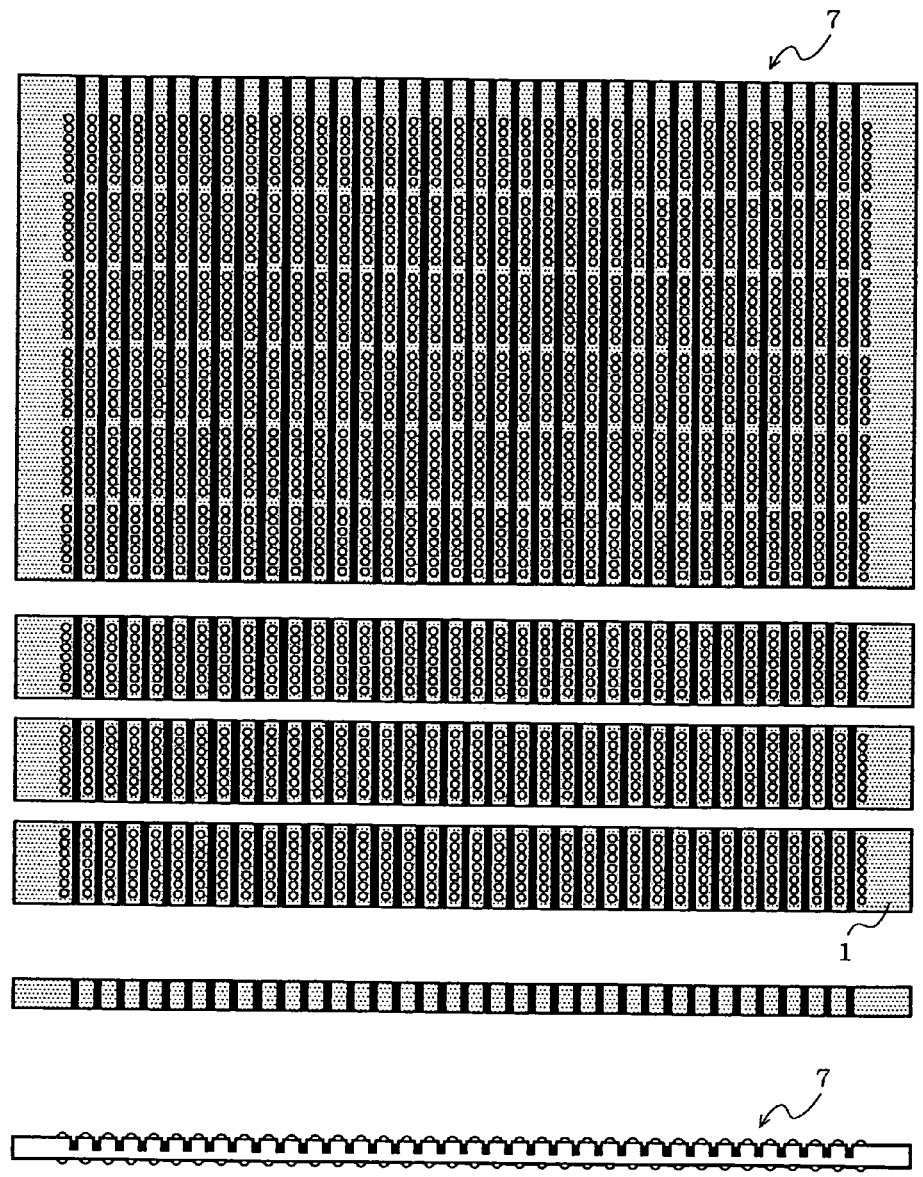
FIG. 8 shows a plan view and a side view showing a large-size lens plate being in a state where it has been cut.

Next, the large-size lens plate 7 is cut. FIG. 8 shows a plan view and a side view showing the state of a large-size lens plate being cut. Individual lens plates 1 are obtained by cutting the large-size lens plate 7 having a number of lens plates formed in parallel.

Next, an image transfer device using an erecting lens array formed by combining lens plates according to the present invention is described with reference to the drawings. FIGS. 9A to 9D are figures showing an example of an image transfer device using lens plates according to the present invention. FIG. 9A is a plan view, FIG. 9B is a sectional view taken along line B—B of FIG. 9A, FIG. 9C is a bottom view, and FIG. 9D is a sectional view taken along line C—C of FIG. 9A.

An erecting lens array is formed by stacking two or more lens plates on one another, and in FIGS. 9A to 9D, an erecting lens array 8 is formed by stacking two of lens plate 1. Each lens plate 1 has convex micro-lenses formed on both faces of it. The erecting lens array 8 is housed in a partition wall structure 9 having a slit-shaped opening 10 that is in parallel with the long sides direction of a rectangular lens formation area of lens plate 1. This partition wall structure 9 is preferably made of a light absorbing material.

The width of the slit-shaped opening 10 of the partition wall structure 9 is determined so as to be capable of sufficiently removing stray light introduced in the short-side direction of the rectangular lens formation area.

As shown in FIGS. 9A to 9D, for example, it is preferable to form rectangular grooves on the reverse faces (exit faces) of the stacked first and second lens plates (four lens faces in total) to form the erecting lens array and to form light shading walls (light absorbing films) for preventing stray light in these rectangular grooves.

In this image transfer device, stray light appearing in the long-side direction of the rectangular lens formation area is effectively removed by rectangular grooves formed in the short-side direction of the rectangular lens formation area of each of the lens plates forming the image transfer device.

Figure 10A:
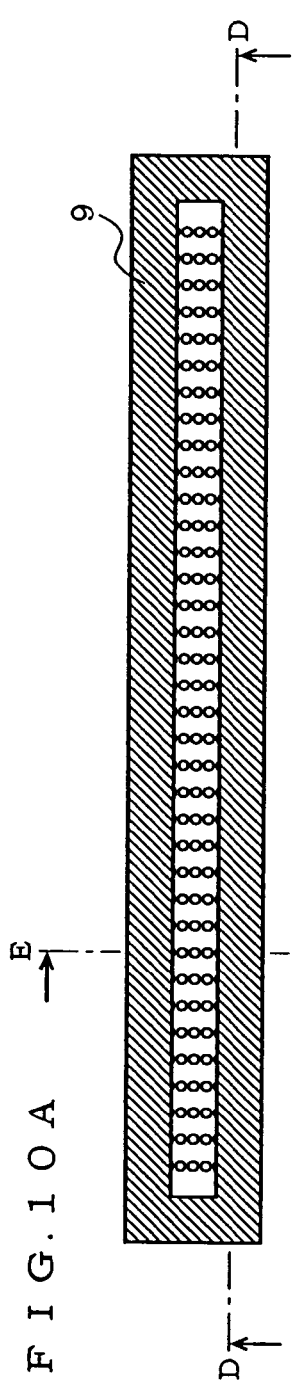
FIG. 10A is a plan view showing another example of an image transfer device using lens plates according to the present invention.
Figure 10B:
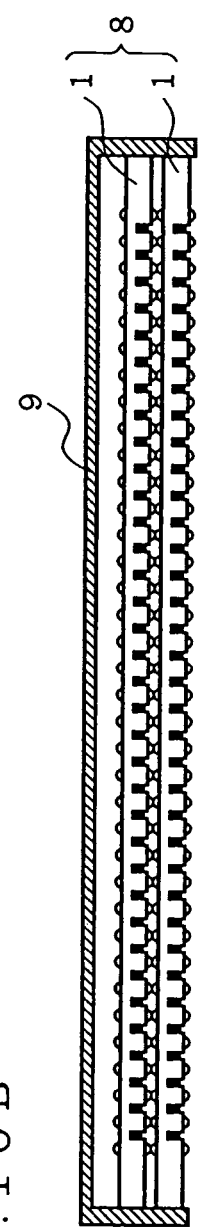
FIG. 10B is a sectional view taken along line D—D of FIG. 10A.
Figure 10D:
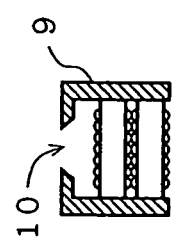
FIG. 10D is a sectional view taken along line E—E of FIG. 10A.
Figure 10C:
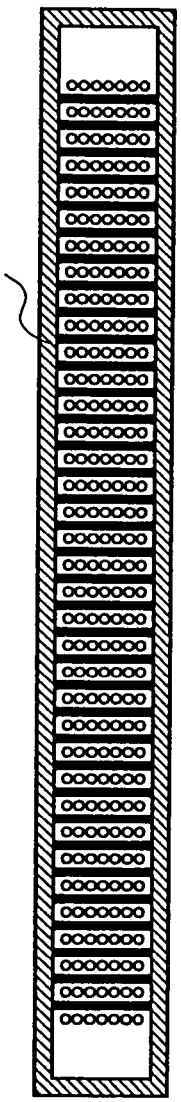
FIG. 10C is a bottom view showing the image transfer device shown in FIG. 10A.

FIGS. 10A to 10D are figures showing another example of an image transfer device using lens plates according to the present invention. FIG. 10A is a plan view, FIG. 10B is a sectional view taken along line D—D of FIG. 10A, FIG. 10C is a bottom view, and FIG. 10D is a sectional view taken along line E—E of FIG. 10A. It is possible to more effectively remove stray light by providing a slit-shaped opening 10 at the entrance side of an erecting lens array as shown in FIGS. 10A to 10D.

FIGS. 11A to 11D are figures showing a further example of an image transfer device using lens plates according to the present invention. FIG. 11A is a plan view, FIG. 11B is a sectional view taken along line F—F of FIG. 11A, FIG. 11C is a bottom view, and FIG. 11D is a sectional view taken along line G—G of FIG. 11A. As shown in FIGS. 11A to 11D, a slit-shaped opening 10 may be provided at each of the entrance side and exit side of an erecting lens array.

Figure 12A:
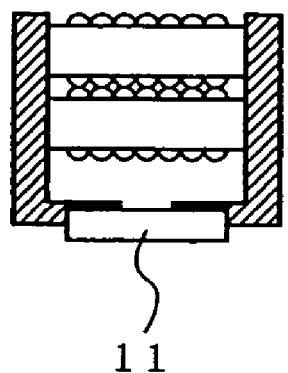
FIG. 12A is a variation example of an image transfer device.
Figure 12B:
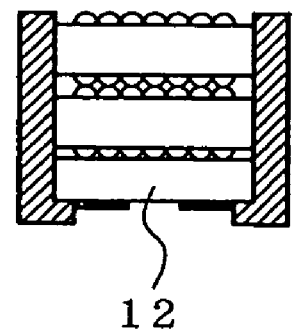
FIG. 12B is a variation example of an image transfer device.

In FIGS. 9A to 9D, FIGS. 10A to 10D and FIGS. 11A to 11D, in order to remove stray light, a partition wall structure 9 is provided with a slit-shaped opening 10 that is in parallel with the long side of the lens formation area, but as shown in FIG. 12A, a slit-shaped opening 10 may be covered with a transparent member 11 of glass or the like, and as shown in FIG. 12B, a partition wall structure 9 may be provided with a opening in parallel with the long side of the lens formation area, the opening being covered with a transparent member 12 of glass or the like having a slit printed on it. By covering the opening with the transparent member it is possible to prevent dust and the like from sticking on the erecting lens array.

In a lens plate according to the first embodiment of the present invention, because portions high in light absorbency are formed in grooves that are each formed between adjacent lens rows of convex micro-lenses, and because each of these portions functions as a light shading wall for removing stray light, it is possible to effectively remove stray light appearing in a direction perpendicular to these grooves.

Also, because a method for manufacturing a lens plate of the present invention forms convex micro-lenses on a resin plate having grooves formed in it, the spaces, provided by the grooves are crushed and filled by heat and pressure and thereby light shading walls come to be formed inside the lens plate. Therefore, the strength of the lens plate can be increased.

Further, in an image transfer device of the present invention, because stray light appearing in the long-side direction of a rectangular lens formation area is effectively removed by grooves formed in the lens plate and because stray light appearing in the short-side direction of the rectangular lens formation area is effectively removed by a partition wall structure, stray light from all directions can be effectively removed.

Next, a second embodiment of the present invention is described with reference to the drawings.

Figure 13:
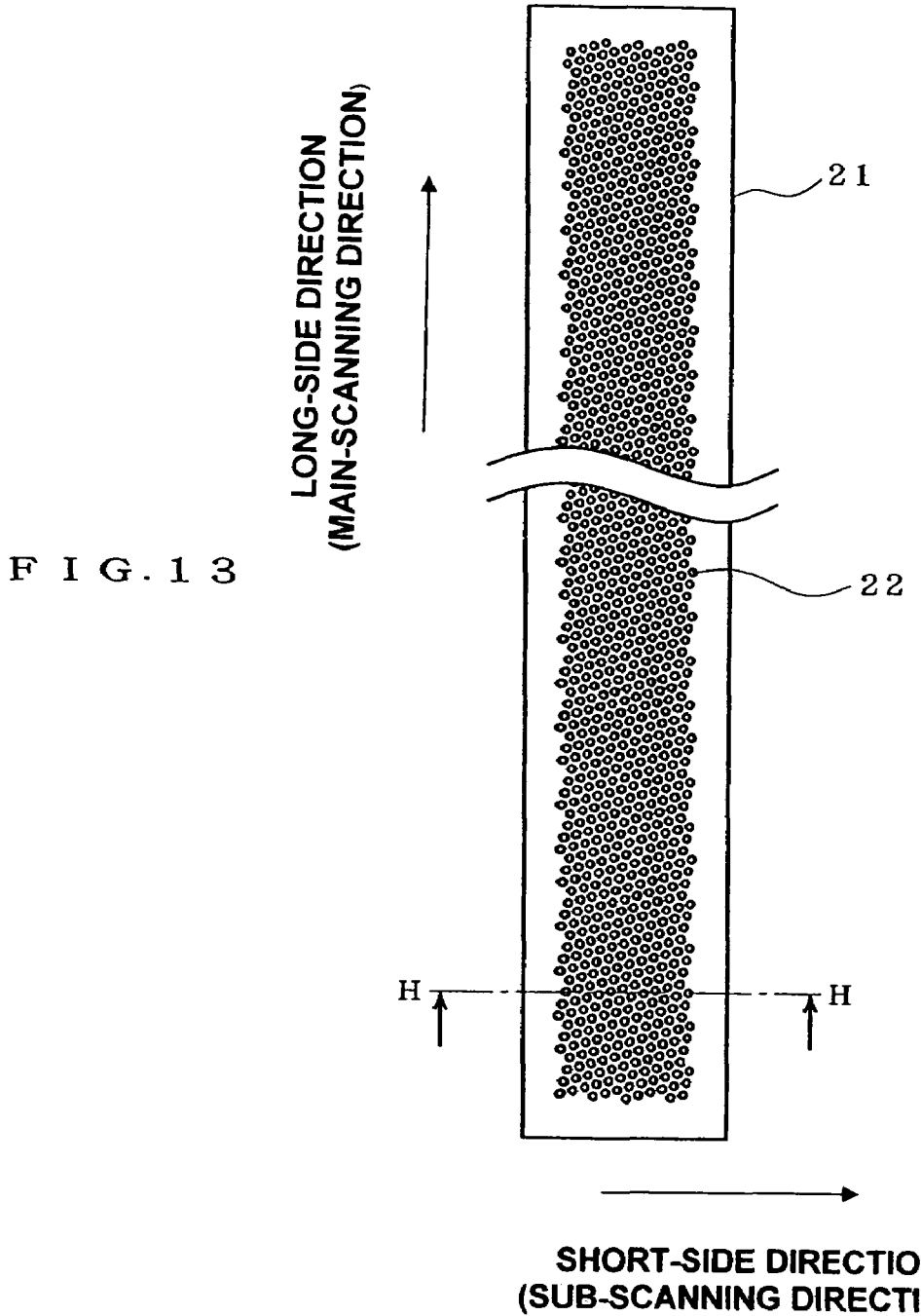
FIG. 13 is a plan view showing a lens plate for forming an erecting lens array according to the present invention.
Figure 14:
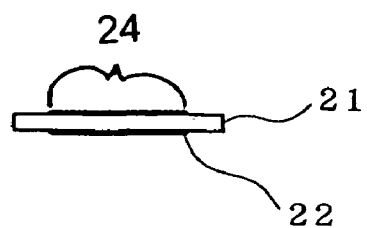
FIG. 14 is a sectional view taken along line H—H of FIG. 13.

FIG. 13 is a plan view showing a lens plate for forming an erecting lens array to be used in an image transfer device for forming an image on a light receiving device or a photosensitive member, and FIG. 14 is a sectional view taken along line H—H of FIG. 13.

A material for a lens plate 21 is preferably a material being thermoplastic, high in light transmittance and low in moisture absorbency. In this embodiment, a lens plate of 2.29 mm in thickness is formed out of a cycloolefin-based resin by an injection molding process. A material for the lens plate 21 may be an acrylic-based resin.

Convex micro-lenses 22 are each a spherical lens of 0.35 mm in lens diameter and 0.66 mm in radius of curvature. The lenses 22 are arranged hexagonally on lens plate 21 at intervals of 0.45 mm in a lens pitch, and are formed on both faces of the lens plate 21. The optical axes and arrangements of the convex micro-lenses 22, respectively, on both faces coincide with each other.

In this embodiment, the shape of a convex micro-lens is spherical but can also be aspherical. In addition to a structure described in which convex micro-lenses are formed on both faces of a lens plate, a structure in which the lenses are formed on one face is also conceivable.

The direction of arrangement of convex micro-lenses is inclined at an angle of 15° with respect to the long-side direction of the lens formation area 24. Lens formation area 24 refers to the area encompassed by the convex micro-lenses 22 in the short-side direction and the long-side direction. Since it is in the direction of arrangement of lenses that a ghost image appears, the direction of arrangement of convex micro-lenses and the long-side direction (main-scanning direction) of the lens formation area are provided so as not to be the same as each other.

An erecting lens array is formed by arranging at least two of such resin lens plates opposite to each other.

Figure 15A:
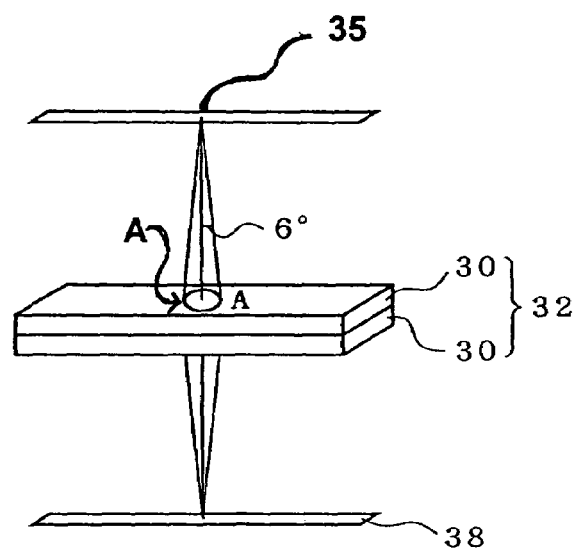
FIG. 15A is a figure showing a state of forming the image of a point light source on an image plane by means of an erecting lens array.
Figure 15B:
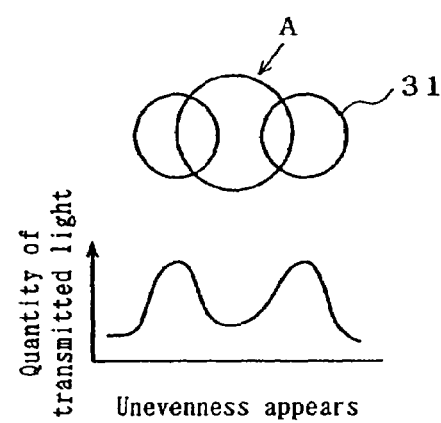
FIG. 15B is a figure for showing a state of producing the unevenness in quantity of transmitted light.
Figure 15C:
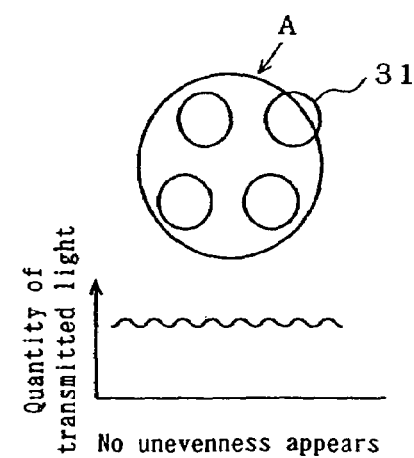
FIG. 15C is a figure for showing a state of producing no unevenness in quantity of transmitted light.

FIG. 15A shows a state in which a light beam outputted from one light source 35 (object to be read) passes through a light beam input enabling area A (a possible area A of light incidence) of an erecting lens array 32 having at least two lens plates 30 arranged opposite to each other and enters a linear solid-state image sensor 38. Although illustrated as a single element, light source 35 is one element of an array of light elements. The unevenness in quantity of transmitted light appears when a whole portion of one or more convex micro-lenses 31 is not contained in a light beam input enabling area A, as shown in FIG. 15B. However, the unevenness in quantity of transmitted light does not appear a whole portion of one or more of convex micro-lenses 31 is contained in a light beam input enabling area A as shown in FIG. 15C. In FIG. 15A, therefore, in order to reduce the unevenness in quantity of transmitted light, a light beam input enabling area A in an erecting lens array 32 of a light beam outputted from a light source contains the whole portion of one or more of convex micro-lenses. It has been determined that the angle of incidence (angular aperture) is ±6°, the working distance is 6.9 mm and the radius of a light beam input enabling area A in an erecting lens array 32 of a light beam outputted from a light source is 0.73 mm. In order to reduce the unevenness in quantity of transmitted light, the area of a light beam input enabling area (determined by the relation between the angle of incidence and the working distance of a lens) needs to be equal to or greater than the area of each individual lens within the light beam input enabling area.

It is preferable that the length in the long-side direction (length in the main-scanning direction) of a lens formation area having convex micro-lenses regularly arranged at intervals of specified lens pitch is equal to or greater than the length in the main-scanning direction of a light beam input enabling area of a light beam outputted from a light source. It is also preferable that the length in the short-side direction (length in the sub-scanning direction) of the lens formation area is equal to or greater than the length in the sub-scanning direction of the light beam input enabling area.

FIG. 16 is a magnified view showing the arrangement of individual convex micro-lenses within a circular area having a radius of two times the lens pitch and one convex micro-lens as its center on a lens plate, and FIG. 17 is a magnified view showing point light source images 33 formed on an image plane.

When forming a point light source into an image on an image plane using an erecting lens array having lens plates arranged opposite to one another, it is in the direction of arrangement of lenses that a ghost image appears. The distance of a point at which a ghost image appears on an image plane from a point light source is determined by the lens pitch and working distance. In FIG. 16, within a circular area having a radius of two times the lens pitch and one convex micro-lens as its center, the direction of a straight line tying the centers of convex micro-lenses 31 in the area is deviated by 15° from the long-side direction (main-scanning direction) of the lens array.

In case of arranging convex micro-lenses in a hexagonal arrangement, it is preferable that the direction of a straight line tying the centers of lenses within the above-mentioned area does not coincide with an angle of 0° (parallel), 30°, 60° or 90° (perpendicular) relative to the long-side direction (main-scanning direction) of the lens array. It is particularly preferable to make an angle of 15°.

In case of a rectangular arrangement in which convex micro-lenses are arranged in the shape of a matrix, a longer lens pitch of rectangularly arranged lenses is set as the long pitch, a shorter one is set as the short pitch, and within a circular area having a radius of $((\text{long pitch})^2+(\text{short pitch})^2)^{1/2}$ and one convex micro-lens as its center, the direction of a straight line tying the centers of convex micro-lenses in the area is deviated from the long-side direction (main-scanning direction) of the lens array.

Figure 18:
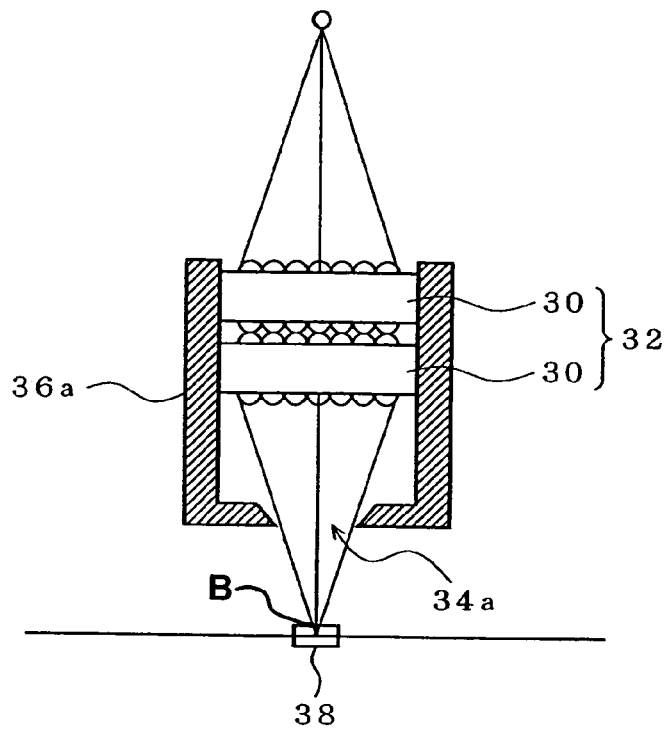
FIG. 18 is a sectional view showing an example of an image transfer device for transferring a linear image to a linear image formation area, using an erecting lens array.

FIG. 18 is a sectional view showing an example of an image transfer device for transferring a linear image to a linear image formation area B using an erecting lens array as described above. An erecting lens array 32 is formed by arranging two lens plates 30 opposite to each other. The lens plates each have convex micro-lenses formed on both faces, and are housed in a partition wall structure 36a having a slit-shaped opening 34a that is in parallel with the long-side direction of the erecting lens array 32 and is provided at the image point side of the erecting lens array 32. A linear solid-state image sensor 38 having at least one row of CCD's arranged is provided in a linear image formation area B to which a linear image is transferred. It is preferable that the size of an area occupied by the linear solid-state image sensor 38 is equal to or greater than that of the linear image formation area. The slit-shaped opening 34a is preferably as close as possible to the solid-state image sensor.

Figure 19:
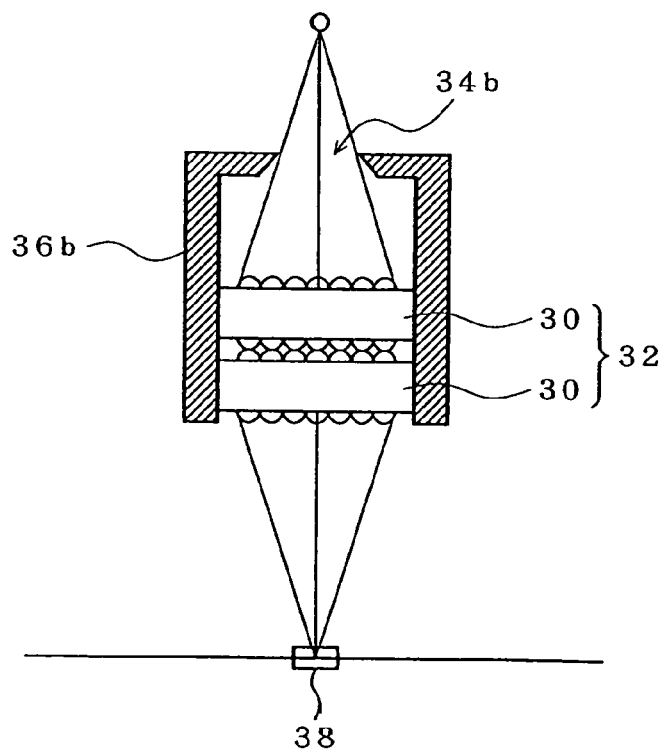
FIG. 19 is a sectional view showing another example of an image transfer device.

FIG. 19 is a sectional view showing another example of an image transfer device, and an erecting lens array 32 is housed in a partition wall structure 36b having a slit-shaped opening 34b formed at the object point side. This is the same as FIG. 18 except that a slit-shaped opening is provided at the object point side. A ghost image can be more effectively reduced by arranging a slit-shaped opening within the working distance at the object point side. It is preferable that the slit-shaped opening 34b is as close as possible to a light source.

Figure 20:
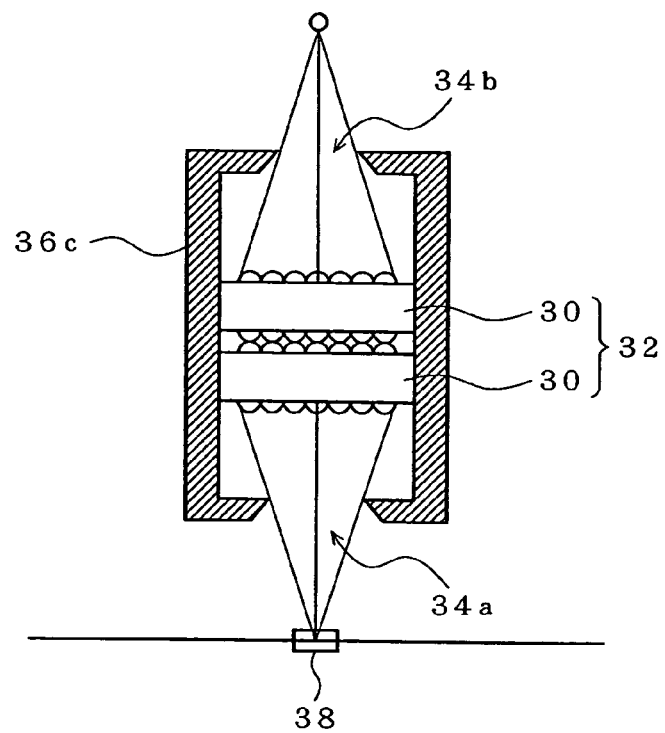
FIG. 20 is a sectional view showing a further example of an image transfer device.

FIG. 20 is a sectional view showing a further example of an image transfer device, having an erecting lens array 32 housed in a partition wall structure 36c. The partition wall structure 36c has a slit-shaped opening 34a at the image point side and a slit-shaped opening 34b at the object point side. Partition wall structure 36c is the same as FIG. 18 or 19 except that slit-shaped openings are provided at the image point side and object point side. As shown in FIG. 20, a slit-shaped opening may be provided within each of the working distance at the object point side and the working distance at the image point side. The slit-shaped opening 34a is preferably as close as possible to a solid-state image sensor and the slit-shaped opening 34b is preferably as close as possible to a light source.

That is to say, the present invention is preferably provided with a partition wall structure having a slit-shaped opening for removing an unnecessary light beam within the object point side working distance and/or the image point side working distance.

The sectional shape of the forefront of a slit-shaped opening has a slope as shown in FIGS. 18, 19 and 20. As shown in FIG. 19, the sectional shape of the forefront of a slit-shaped opening may be wider at the lens side. Preferably, the sectional shape is made more narrow at the light incidence side like the slit-shaped opening 34a provided at the image point side of the partition wall structure shown in FIG. 20. It is enough that the angle of slope of the forefront of a slit-shaped opening is an angle providing no scattering in a range of exerting no influence upon an image formation, and, in particular, it is preferably of an angle of 45° or less. A slit-shaped opening may be formed into one body with a partition wall structure and may be also provided separately from it. The long-side direction of a slit-shaped opening is preferably in parallel with the main-scanning direction of a linear image formation area. The position and width of the slit is properly designed within a range corresponding where a ghost image of a linear image does not appear in a linear image formation area.

An image to be read is assumed to be a linear image in this case but may be either a point image or a planar image. The slit is particularly effective in case of a planar image. For a point image and a linear image, although preferable, a slit-shaped opening may be or may not be provided at the object point side and image point side. In case of a planar image, it is indispensable to provide a slit-shaped opening at the object point side. It may or may not be provided at the image point side, but it is preferably provided.

A partition wall structure having a slit-shaped opening preferably has a light absorbing function in its inner walls in order to remove a light beam reflected in an optical system. Alternatively, a partition wall structure itself is preferably formed out of a light absorbing material. It is also, preferable to make a partition wall structure have a light absorbency by using a black partition wall material for the partition wall structure and making the surface of the partition wall material finely textured.

The length in the short-side direction (length in the sub-scanning direction) of a lens formation area of an erecting lens array is made to be equal to or more than the length in the short-side direction (length in the sub-scanning direction) of a slit-shaped opening and the length in the short-side direction of the slit-shaped opening is made to be equal to or more than the length in the short-side direction (length in the sub-scanning direction) of a solid-state image sensor.

In an exemplary embodiment, the length in the short-side direction of a slit-shaped opening is 0.5 mm and the length in the short-side direction of a lens formation area is 2.0 mm in consideration of the tolerance in alignment of the slit-shaped opening and the solid-state image sensor.

Further, the length in the long-side direction (length in the main-scanning direction) of a lens formation area of an erecting lens array is made to be equal to or more than the length in the long-side direction (length in the main-scanning direction) of a slit-shaped opening and the length in the long-side direction of the slit-shaped opening is made to be equal to or more than the length in the long-side direction (length in the main-scanning direction) of a solid-state image sensor.

The working distance of an erecting lens array is made to be equal to or more than a slit depth. The working distance being from the lens face of the erecting lens array to the slit-shaped opening.

As a linear solid-state image sensor 38, a device having CCD's arranged in one line can be used in case of transferring a monochrome linear image and a device having CCD's arranged in three lines can be used in case of transferring a color linear image.

Figure 21:
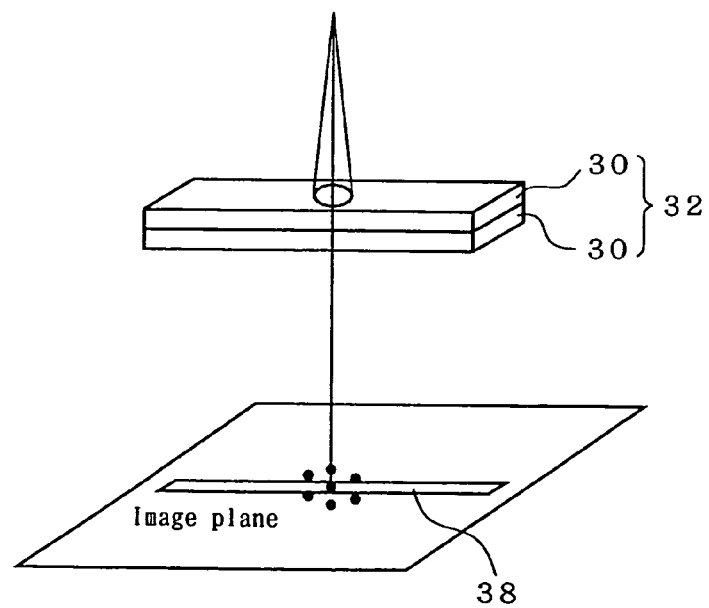
FIG. 21 is a figure for explaining a state of forming an image on a linear solid-state image sensor.

FIG. 21 is a figure for explaining a state of forming an image on a linear solid-state image sensor 38, FIG. 22 is a magnified view showing the arrangement of individual convex micro-lenses 31 within a circular area having a radius of two times the lens pitch and one convex micro-lens as its center on an erecting lens array, and FIG. 23 is a magnified view showing image points formed on a linear solid-state image sensor 38 in a linear image formation area and points at which a ghost image appears.

In case of taking an image into a solid-state image sensor through an erecting lens array, in order to reduce the stray light entering the solid-state image sensor, convex micro-lenses are arranged so that the direction of arrangement of the convex micro-lenses and the long-side direction of the solid-state image sensor do not become the same as each other.

In case of arranging convex micro-lenses in a hexagonal arrangement, the direction of a straight line tying the centers of convex micro-lenses is made so as not to become the same as the long-side direction of a solid-state image sensor in a circular area having a radius of two times the lens pitch and one convex micro-lens as its center.

In case of a rectangular arrangement, the direction of a straight line tying the centers of convex micro-lenses is made so as not to become the same as the long-side direction of a solid-state image sensor within a circular area having a radius of $((\text{long pitch})^2+(\text{short pitch})^2)^{1/2}$ and one convex micro-lens as its center.

As described above, it is necessary that at least the long-side direction of a solid-state image sensor and the direction of arrangement of convex micro-lenses do not coincide with each other in a circular area having a radius of two times the lens pitch and one convex micro-lens as its center in case of arranging convex micro-lenses in a hexagonal arrangement and in a circular area having a radius of $((\text{long pitch})^2+(\text{short pitch})^2)^{1/2}$ and one convex micro-lens as its center in case of a rectangular arrangement. Furthermore, in the above-described areas, it is necessary that a ghost image is not formed in an area of the solid-state image sensor, namely, that half the length in the short-side direction of the solid-state image sensor is shorter than the shortest distance from the center line along the long-side direction of the solid-state image sensor to an image point at which a ghost image appears.

In a manufactured image transfer device, the result of taking an image into a solid-state image sensor for the combination of a linear image, an erecting lens array, a slit and the solid-state image sensor has shown that stray light is so slight that it is impossible to distinguish between the influences of quantizing noise and stray light.

Examination of image formation characteristics of a point light source has shown that the quantity of stray light at a location where a solid-state image sensor is to be installed has been reduced to 2/1000.

Figure 24:
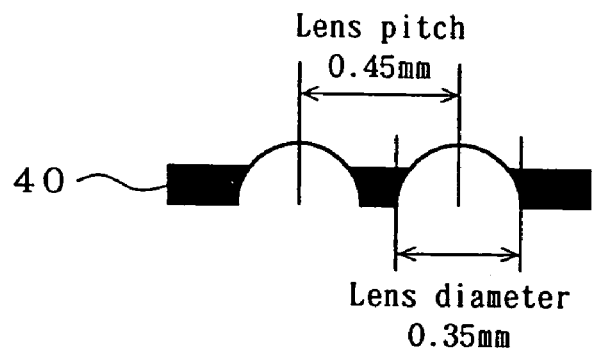
FIG. 24 is a figure for explaining a state where a lens plate is provided with a light absorbing film between lenses.
Figure 25:
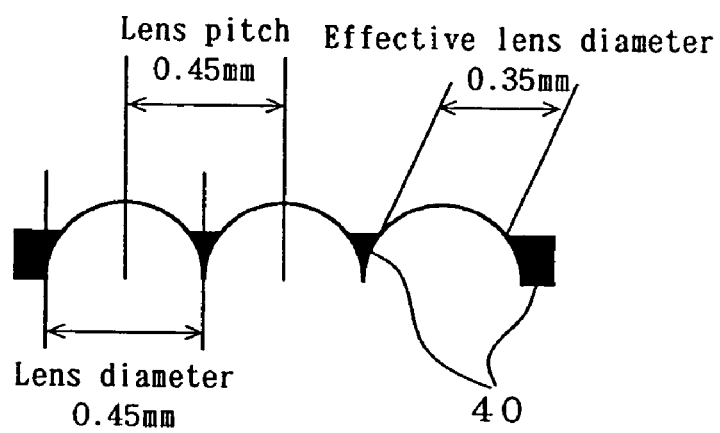
FIG. 25 is a figure for explaining a state where a light absorbing film is provided between lenses arranged in the hexagonal close-packed arrangement.

FIG. 24 is a figure for explaining a state of providing a light absorbing film (light shading film) 40 between lenses of 0.35 mm in lens diameter arranged at intervals of 0.45 mm in lens pitch on a lens plate and FIG. 25 is a figure for explaining a state of providing a light absorbing film (light shading film) 40 between lenses of 0.45 mm in lens diameter arranged at intervals of 0.45 mm in lens pitch in the hexagonal close-packed arrangement (arranged in contact with one another).

Figure 26:
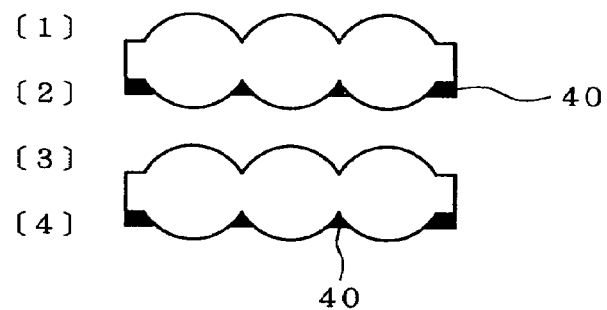
FIG. 26 is a figure for explaining an example of the arrangement of light absorbing films.

Assuming that lens faces of lens plates forming an erecting lens array are face [1], face [2], face [3], . . . , face [N], respectively, in an order from the light source entrance side, each face corresponding to an even number is preferably provided with a light absorbing film 40. Each face corresponding to an of odd number may or may not be provided with the light absorbing film 40, but is preferably provided. FIG. 26 is a figure for explaining an example of arrangement of light absorbing films in case of having lens faces of faces [1] to [4].

When using an erecting lens array having at least two lens plates arranged opposite to each other as an optical system, when it is assumed that a perpendicular line from a solid-state image sensor (CCD) to a lens face is an optical axis, the solid-state image sensor also has a light beam (stray light) other than the light beam emitted from an object point on the optical axis inputted into it.

This stray light depends on the arrangement (direction and pitch) and angular aperture of the erecting lens array. A greater amount of stray light enters from a direction in which the lens pitch is smaller. When the angular aperture is made smaller, stray light comes to enter from a part closer to the optical axis. Stray light from a part closer to the optical axis has a greater influence on an image, whereas stray light more distant from the optical axis has a smaller influence on the image.

In order to obtain a good image formation performance by an erecting unit magnification optical system, stray light must be removed by some method. An image transfer device of the present invention removes the stray light from a part relatively close to the optical axis by a slit-shaped opening and removes the stray light from a part distant from the optical axis by a light shading film provided between lenses on a lens plate.

In case that the angular aperture of lens is wide, an angle causing a ghost image to appear is only a wide angle and since it is enough to remove only a ghost image in a wide angle range, it is possible to remove a ghost image by means of only light shading films. On the other hand, in case that the angular aperture of lens is narrow, an angle causing a ghost image to appear ranges from a narrow angle to a wide angle and light in a wide range enters a solid-state image sensor and therefore, it is preferable to remove a ghost image in a narrow angle range by a slit-shaped opening and a ghost image in a wide angle range by light shading films. Accordingly, in case of a narrow angular aperture, it is preferable to provide both a slit-shaped opening and light shading films. For example, in case of an angular aperture of 10°, light shading films may be enough but in case of an angular aperture of 6°, it is preferable to provide both a slit-shaped opening and light shading films.

In case that a slit-shaped opening cannot be provided for reasons such as device design, it is possible also to obtain an almost equivalent effect to a slit by making the height of each light shading film higher.

Figure 27:
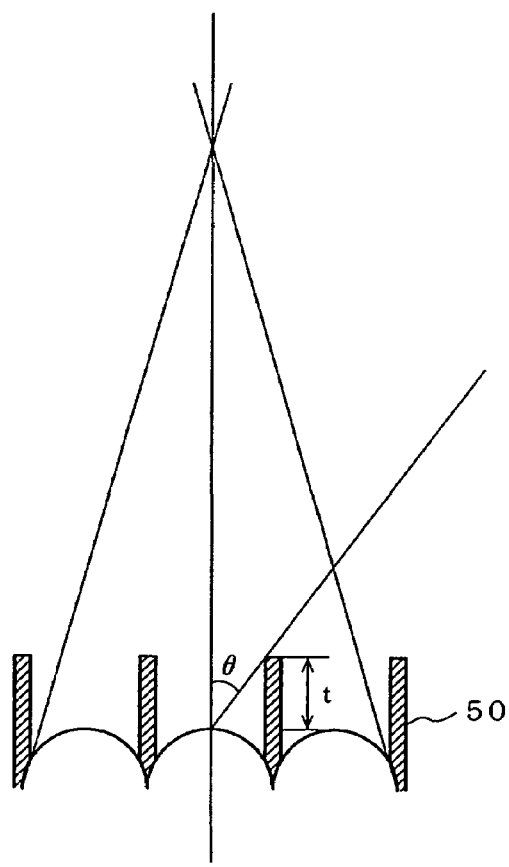
FIG. 27 is a figure for explaining a state where a lens plate is provided with a light shading wall between lenses.

FIG. 27 is a figure for explaining a state of providing a light shading wall between lenses on a lens plate. It is preferable to provide light shading walls 50 of light absorbency on at least one lens plate.

Light shading walls of 0.35 mm in aperture diameter, 0.42 mm in pitch and 0.2 mm or more in height (height from the vertex of a lens to the top of a light shading wall) are provided on individual lenses of 0.35 mm in lens diameter and 0.42 mm in lens pitch. Because an angle θ made between a light beam entering the vertex of a lens and the optical axis of the lens is made to be 45° or less by providing such light shading walls, it is possible to remove a light beam making an angle greater than 45° with the optical axis of lens, namely, the stray light from a part distant from the optical axis. Because, the angle of incidence of stray light varies according to the angular aperture of lens, it is enough to properly design the height of a light shading wall in relation to the angular aperture of lens. The height is preferably 0.15 to 2.0 mm and more preferably 0.2 to 2.0 mm.

Figure 28A:
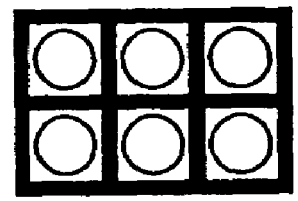
FIG. 28A is a figure showing an example of the shape of a light shading wall in the planar direction of a lens plate.
Figure 28B:
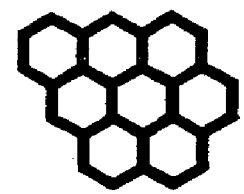
FIG. 28B is a figure showing an example of the shape of a light shading wall in the planar direction of a lens plate.
Figure 28C:
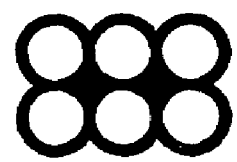
FIG. 28C is a figure showing an example of the shape of a light shading wall in the planar direction of a lens plate.
Figure 28D:
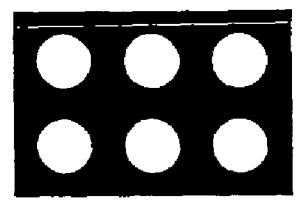
FIG. 28D is a figure showing an example of the shape of a light shading wall in the planar direction of a lens plate.
Figure 28E:
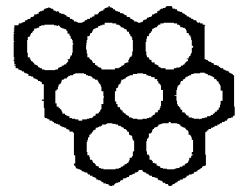
FIG. 28E is a figure showing an example of the shape of a light shading wall in the planar direction of a lens plate.

It is conceivable that the shape of a light shading wall in the planar direction of a lens plate is rectangular as shown in FIG. 28A, hexagonal (honeycomb-shaped) as shown in FIG. 28B, circular as shown in FIG. 28C, or shapes where all parts except lenses are formed as a light shading wall as shown in FIG. 28D and FIG. 28E. In case of assuming that lens faces are face [1], face [2], face [3], . . . , face [N], respectively, in an order from the light source entrance side, it is preferable to provide light shading wall 50 on face [1].

Figure 29:
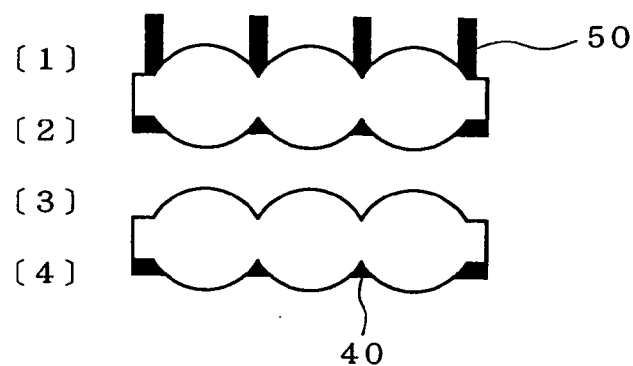
FIG. 29 is a figure for explaining an example of the arrangement of a light shading wall.
Figure 30:
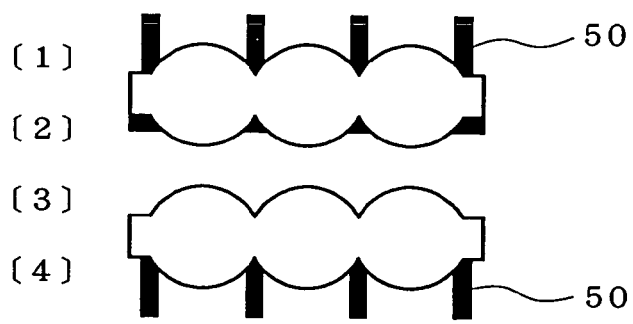
FIG. 30 is a figure for explaining an example of the arrangement of light shading walls.

In case of providing both of light shading wall 50 and light absorbing film 40, light shading wall 50 is desirably provided on face [1] that is closest to the light source entrance side and light absorbing film 40 is desirably provided on face [N] that is most distant from the light source entrance side. As for faces between face [1] and face [N], either of face [2M (M=1, 2, 3, . . . )] or face [2M+1] is provided with light absorbing film 40. Light absorbing film 40 on face [N] may be replaced with light shading wall 50. FIG. 29 is a figure for explaining an example of arrangement of light shading wall 50 and light absorbing film 40 in case of the existence of lens faces [1] to [4], and FIG. 30 is a figure for explaining an example of arrangement in case of replacing light absorbing film 40 of face [4] with light shading wall 50. A light shading wall may be formed out of the same material as a light absorbing film.

Figure 31:
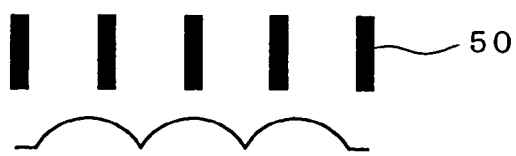
FIG. 31 is a figure for explaining a state where a light shading wall is provided above a lens plate.

FIG. 31 is a figure for explaining a state of providing a light shading wall above a lens plate. Even when a light shading wall 50 is above the lens plate without being in contact with a lens plate, a similar effect can be obtained. When a light shading wall is not in contact with a lens plate, the pitch of lenses and the pitch of light shading walls may be different from each other. When a light shading wall is not in contact with a lens plate, because light is inputted from a wider angle range, a higher light shading wall is required than when both of them are in contact with a lens plate (at least double or more height is required). When both of them are not in contact with each other, because a problem of moiré occurs, both of them are preferably in contact with each other.

When the height of a light shading wall is several hundred microns or more, depending upon the light transmittance and the lens angular aperture of an erecting unit magnification optical system, because stray light distant from the optical axis as well as stray light close to the optical axis can be removed, a good image can be obtained even when the above-described partition wall structure is not provided with a slit-shaped opening.

Next, making a light shading wall is described. A first embodiment for making a light shading wall forms a light shading wall by means of a thick film printing process. First, a photosensitive black resin paint (ink or resist) is applied to a resin base material to a specified thickness (20 to 100 μm) and is dried until the stickiness of the surface disappears. The drying is performed at a temperature not higher than the softening temperature of the resin base material.

A marker is installed outside a print-patterning area and then exposure is performed using a mask. By repeating these processes, the black resin paint is stacked up to a desired thickness. Next, development and post-cure (hardening by heating) are performed. In this embodiment, the thickness obtained by performing the process is 70 μm and a wall of 210 μm is formed by repeating the process three times. The surface of the black resin is preferably pear-skin (textured) in order to reduce a surface reflection. Particularly the inner wall is preferably pear-skin.

A second embodiment for making a light shading wall forms a light shading wall by forming a black resin rib. First, a black resin rib is made by an injection molding process according to the following procedure. A plate like pinholder having rod-like projections and a pair of metal molds consisting of a multi-hole plate having holes corresponding to the projections and a flat plate are used in molding. First, this embodiment places the multi-hole plate on the pinholder-like plate While inserting the projections of the pinholder-like plate into the holes of the multi-hole plate, and further places the flat plate thereon.

Next, resin is injected through many pin gates provided in the flat plate. The space between the multi-hole plate and the flat plate is filled with the resin and is cooled. After being cooled, the flat plate is detached and then a molded product is exfoliated from the pinholder-like plate. When making the inner wall pear-skin, it is proper to provide a draft angle of 10° or less in order to facilitate a mold-releasing action after molding. The obtained molded product is placed on a lens plate to form a lens array with a light shading wall.

When providing a draft angle to a projection, stray light can be efficiently removed by arranging the thinner side of a resin rib at the lens side. The quantity of transmitted light is increased by arranging the thicker side of the resin rib at the lens side. The shape of holes of a resin rib may be hexagonal (honeycomb-shaped), rectangular, circular or any shape.

In both of the first and second embodiments, it is desirable that the coefficient of thermal expansion of resin used in a light shading wall is close to that of resin used in a lens. The coefficient of thermal expansion is preferably on the order of $10^{-5}(1/°C)$.

In addition to the first and second embodiments, a rib can be also made by making holes in a black film or the like having a specified thickness by means of an ultraviolet laser beam.

Figure 32:
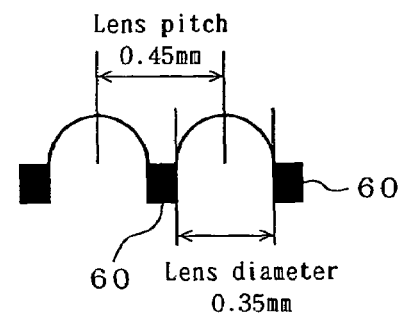
FIG. 32 is a figure for explaining a state where a light shading groove is provided between lenses.

FIG. 32 is a figure for explaining a state of providing a light shading groove between lenses of 0.35 mm in lens diameter and 0.45 mm in lens pitch. It is preferable to provide a light shading groove 60 between lenses on one face or both faces of at least one lens plate in order to remove an unnecessary light beam. A deeper light shading groove is more preferable, and the depth of the groove is preferably 30% or more of the thickness of a lens plate, more preferably 50% or more, and most preferably 60% or more.

Figure 33:
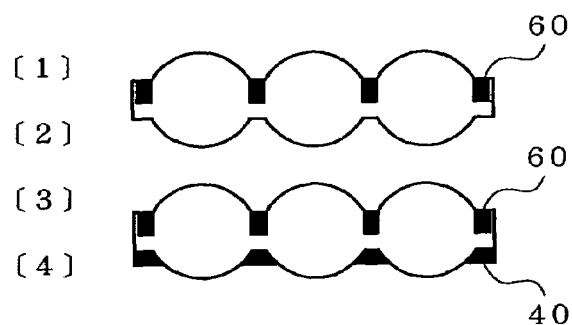
FIG. 33 is a figure for explaining an example of the arrangement of light shading grooves.
Figure 34:
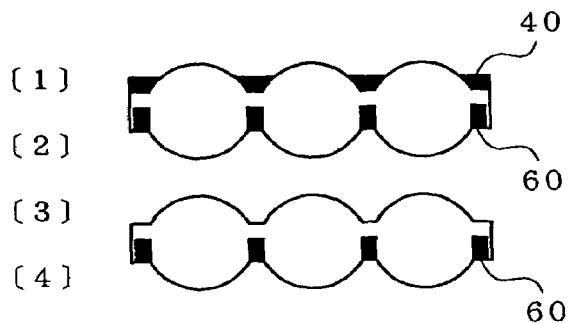
FIG. 34 is a figure for explaining an example of the arrangement of light shading grooves.

In case of assuming that lens faces are face [1], face [2], face [3], . . . , face [N], respectively, in an order from the light source entrance side, a light shading groove is provided on a face having an odd number or an even number. FIG. 33 is a figure for explaining an example of arrangement of light absorbing films when providing light shading grooves on faces of odd numbers out of faces [1] to [4]. When providing light shading grooves on faces of odd numbers, light absorbing film 40 is desirably provided on face [N] being most distant from the light source entrance side, and a light absorbing film may or may not be provided on the other faces of even numbers other than face [N]. FIG. 34 is a figure for explaining an example of arrangement of light absorbing films when providing light shading grooves on faces of even numbers out of faces [1] to [4]. When providing light shading grooves 60 on faces of even numbers, light absorbing film 40 is desirably provided on face [1], and a light absorbing film may or may not be provided on the other faces of odd numbers other than face [1].

In FIGS. 33 and 34, light shading film 40 may be replaced with light shading groove 60, and light shading grooves 60 may be provided on all faces.

And in the above-described embodiments, in order to remove a light beam of unnecessary wavelength from entering a solid-state image sensor, an ultraviolet cutoff function or an infrared cutoff function may be provided in a lens plate, or an ultraviolet cutoff filter or an infrared cutoff filter may be provided in an optical path.

With respect to the combination of a slit-shaped opening, a light shading film, a light shading wall and a light shading groove, one of the most preferable combinations is a combination of a slit-shaped opening, a light shading film and a light shading wall (or light shading groove) provided on face [1] closest to the light source entrance side (hereinafter, referred to as combination (1)). In case of providing light shading films on all faces other than face [1], it is possible to remove a ghost image at all lens angular apertures. A light shading wall or a light shading groove may be used in place of a light shading film. Another preferable combination is the combination of a light shading film and a light shading wall (or a light shading groove) provided on face [1] closest to the light source entrance side (hereinafter, referred to as combination (2). This combination is preferable in case of a wide angular aperture. A light shading wall or a light shading groove may be used in place of a light shading film. It is preferable that each of combination (1) and combination (2) is provided with a partition wall structure having an erecting lens array housed in it.

Because an erecting lens array according to the second embodiment of the present invention is formed so that the direction of arrangement of convex micro-lenses and the long-side direction of a lens formation area are not the same as each other, it can sufficiently remove stray light.

Because an image transfer device according to the second embodiment is made so that the long-side direction of a solid-state image sensor and the direction of arrangement of lenses are not the same as each other and no ghost image is formed in the area of the solid-state image sensor, a ghost image can be sufficiently removed.

What is claimed is:

1. A lens plate comprising;
a rectangular plate having a plurality of grooves formed to a specified depth at specified intervals in parallel with one another in the short-side direction of the plate,
a plurality of lens rows of convex micro-lenses, said lens rows being formed with said grooves between them at specific intervals in parallel with one another in the shot-side direction of the plate on said plate, and
light absorbing films formed in said grooves,
wherein the grooves extend continuously across multiple convex micro-lenses in the short-side direction.

2. A lens plate according to claim 1, wherein;
in case that the lens rows of said convex micro-lenses are arranged on one face of said plate, said grooves are formed on a face on which the lens rows of said convex micro-lenses are formed or a face opposite to that face, and
in case that the lens rows of said convex micro-lenses are arranged on both faces of said plate, said grooves are formed on at least one of the faces on which the lens rows of said convex micro-lenses are formed.

3. A lens plate according to claim 1, wherein;
said grooves are formed to a depth of ⅓ or more of the thickness of said plate.

4. A lens plate according to one of claims 1 to 3, wherein;
said plate is formed out of resin.

* * * * *